United States Patent
Liu et al.

(10) Patent No.: US 9,083,274 B2
(45) Date of Patent: Jul. 14, 2015

(54) POWER STAGE PRECHARGING AND DYNAMIC BRAKING APPARATUS FOR MULTILEVEL INVERTER

(71) Applicants: Jingbo Liu, Grafton, WI (US); Thomas Nondahl, Greenfield, WI (US)

(72) Inventors: Jingbo Liu, Grafton, WI (US); Thomas Nondahl, Greenfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 240 days.

(21) Appl. No.: 13/858,187

(22) Filed: Apr. 8, 2013

(65) Prior Publication Data
US 2014/0300298 A1 Oct. 9, 2014

(51) Int. Cl.
*H02P 3/12* (2006.01)
*H02P 3/22* (2006.01)
*H02M 5/453* (2006.01)
*H02P 3/18* (2006.01)

(52) U.S. Cl.
CPC ............... *H02P 3/22* (2013.01); *H02M 5/453* (2013.01); *H02P 3/18* (2013.01)

(58) Field of Classification Search
USPC ................................................ 318/380, 375
See application file for complete search history.

(56) References Cited

U.S. PATENT DOCUMENTS

| | | |
|---|---|---|
| 3,757,197 A | 9/1973 | Bailey |
| 4,039,914 A | 8/1977 | Steigerwald et al. |
| 4,215,304 A | 7/1980 | D'Atre et al. |
| 4,230,979 A | 10/1980 | Espelage et al. |
| 4,276,589 A | 6/1981 | Okawa et al. |
| 4,496,899 A | 1/1985 | Lippitt et al. |
| 4,545,002 A | 10/1985 | Walker |
| 4,833,389 A | 5/1989 | Kovalsky et al. |
| 4,870,338 A | 9/1989 | Abbondanti |
| 5,005,115 A | 4/1991 | Schauder |
| 5,041,959 A | 8/1991 | Walker |
| 5,083,039 A | 1/1992 | Richardson et al. |
| 5,715,154 A | 2/1998 | Rault |
| 5,798,632 A | 8/1998 | Muljadi |
| 5,875,281 A * | 2/1999 | Thexton et al. ............... 388/801 |
| 5,933,339 A | 8/1999 | Duba et al. |
| 5,969,957 A | 10/1999 | Divan et al. |
| 6,005,362 A * | 12/1999 | Enjeti et al. ................... 318/479 |
| 6,058,031 A * | 5/2000 | Lyons et al. ................... 363/67 |
| 6,118,676 A | 9/2000 | Divan et al. |
| 6,157,097 A | 12/2000 | Hirose et al. |
| 6,166,513 A | 12/2000 | Hammond |
| 6,166,929 A | 12/2000 | Ma et al. |
| 6,229,722 B1 | 5/2001 | Ichikawa et al. |
| 6,262,555 B1 | 7/2001 | Hammond et al. |
| 6,301,130 B1 | 10/2001 | Aiello et al. |
| 6,377,478 B1 | 4/2002 | Morishita |
| 6,417,644 B2 | 7/2002 | Hammond et al. |
| 6,646,842 B2 | 11/2003 | Pan et al. |
| 6,956,751 B2 * | 10/2005 | Youm et al. ..................... 363/37 |
| 7,158,393 B2 | 1/2007 | Schneider |
| 7,170,245 B2 * | 1/2007 | Youm ............................. 318/375 |

(Continued)

FOREIGN PATENT DOCUMENTS

JP 2002345258 A 11/2002

*Primary Examiner* — Erick Glass
(74) *Attorney, Agent, or Firm* — Fay Sharpe LLP

(57) ABSTRACT

Precharging and dynamic braking circuits are presented for multilevel inverter power stages of a power converter with a shared resistor connected to charge a DC bus capacitor with current from the rectifier circuit in a first operating mode and connected in parallel with the capacitor to dissipate power in a dynamic braking mode.

20 Claims, 6 Drawing Sheets

(56) References Cited

U.S. PATENT DOCUMENTS

| | | |
|---|---|---|
| 7,233,465 B2 | 6/2007 | Lee |
| 7,312,537 B1 | 12/2007 | Walling |
| 7,432,686 B2 | 10/2008 | Erdman et al. |
| 7,462,946 B2 | 12/2008 | Wobben |
| 7,505,291 B2 | 3/2009 | Wang et al. |
| 7,508,147 B2 | 3/2009 | Rastogi et al. |
| 7,511,385 B2 | 3/2009 | Jones et al. |
| 7,511,975 B2 | 3/2009 | Hammond |
| 7,595,563 B2 | 9/2009 | Wobben |
| 7,656,052 B2 | 2/2010 | Jones et al. |
| 7,663,260 B2 | 2/2010 | Kabatzke et al. |
| 7,679,208 B1 | 3/2010 | Ko et al. |
| 7,692,321 B2 | 4/2010 | Jones et al. |
| 7,692,325 B2 | 4/2010 | Ichinose et al. |
| 7,755,209 B2 | 7/2010 | Jones et al. |
| 7,816,798 B2 | 10/2010 | Hehenberger |
| 7,880,343 B2 | 2/2011 | Kleinecke et al. |
| 7,929,323 B2 | 4/2011 | Schmidt |
| 7,965,529 B2 | 6/2011 | Gibbs et al. |
| 8,030,791 B2 | 10/2011 | Lang et al. |
| 8,223,515 B2 | 7/2012 | Abolhassani et al. |
| 2002/0191426 A1 | 12/2002 | Hussein et al. |
| 2003/0035311 A1 | 2/2003 | Phadke |
| 2006/0232250 A1 | 10/2006 | Sihler et al. |
| 2008/0074812 A1 | 3/2008 | Oestreich et al. |
| 2011/0057444 A1 | 3/2011 | Dai et al. |
| 2011/0057588 A1 | 3/2011 | Rineh et al. |

\* cited by examiner

POWER STAGE PRECHARGING AND DYNAMIC BRAKING APPARATUS FOR MULTILEVEL INVERTER

BACKGROUND

Power converters are used to convert input electrical energy from one form to another for driving a load. One form of power conversion system is a motor drive, which may be employed for variable speed operation of an electric motor load. Multilevel inverters such as Cascaded H-Bridge (CHB) inverters are sometimes employed in motor drives and other power conversion systems to generate and provide high voltage drive signals, with individual power cells or power stages being connected in series. Each stage provides a separate DC source and is driven by switch signals to generate positive or negative output voltage, with the series combination of multiple stage outputs providing multilevel inverter output capability for driving the load at variable speeds and torques.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides apparatus and techniques for precharging DC bus capacitors of individual multilevel inverter power stages or cells, as well as for implementing dynamic braking within the power stage using a shared resistor.

In accordance with one or more aspects of the disclosure, a power conversion system is provided which includes a multilevel inverter with one or more inverter legs each having a plurality of power stages individually providing multiple distinct output voltage levels, as well as a converter system controller providing switching control signals to set the individual output levels of the power stages. The individual power stages include a DC bus circuit provided with DC voltage by a rectifier, as well as a switching circuit that provides a power stage output voltage at one of a plurality of distinct levels. A precharge and dynamic braking circuit is provided within the individual power stages, including a resistor connected between the rectifier and the switching circuit. The precharge and dynamic braking circuit operates in a first mode to conduct current from the rectifier through the resistor to charge the DC bus capacitor, as well as in a second mode to bypass the resistor and allow current to flow from the rectifier to the switching circuit for normal operation. In a third operating mode, the precharge and dynamic braking circuit connects the resistor in parallel with a capacitor to facilitate dynamic braking operation.

In certain embodiments, the precharge and dynamic braking circuit includes a first switch coupled in a DC circuit branch between the rectifier and the switching circuit, as well as a first diode coupled in parallel with the first switch. For normal or dynamic braking operation, the first switch is closed or otherwise rendered conductive to bypass the resistor, and the switches are opened or rendered nonconductive so that precharging current from the rectifier flows through the resistor to charge the capacitor in a precharge operating mode. In various embodiments, moreover, a second switch is coupled between another DC circuit branch and the resistor, with the second switch being open or non-conductive during normal and precharging operation, and the second switch is closed or pulse width modulated during dynamic braking for selective connection of the resistor in parallel with the DC bus capacitor. In certain implementations, a power stage controller provides control signals to the first and second switches to set the operating mode according to the DC bus voltage of the power stage, such as by setting the circuit to a first or precharge operating mode if the DC bus voltage is less than a first (e.g., lower) threshold, operating in a second or normal mode with the resistor not conducting any current when the DC bus voltage is above the first threshold and below a second (e.g., higher) threshold, and operating in a third or dynamic braking mode when the DC bus voltage exceeds the second threshold.

Methods and non-transitory computer readable mediums are provided with computer executable instructions for operating individual power stages of a multilevel inverter. These techniques include precharging a DC bus capacitance of the power stage through a resistor if the DC bus voltage is less than a first threshold, and connecting the resistor in parallel with the DC bus capacitance if the voltage is greater than a second threshold. In certain embodiments, the resistor is bypassed to allow current flow between the rectifier and the power stage switching circuit if the DC bus voltage is between the first and second threshold values.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
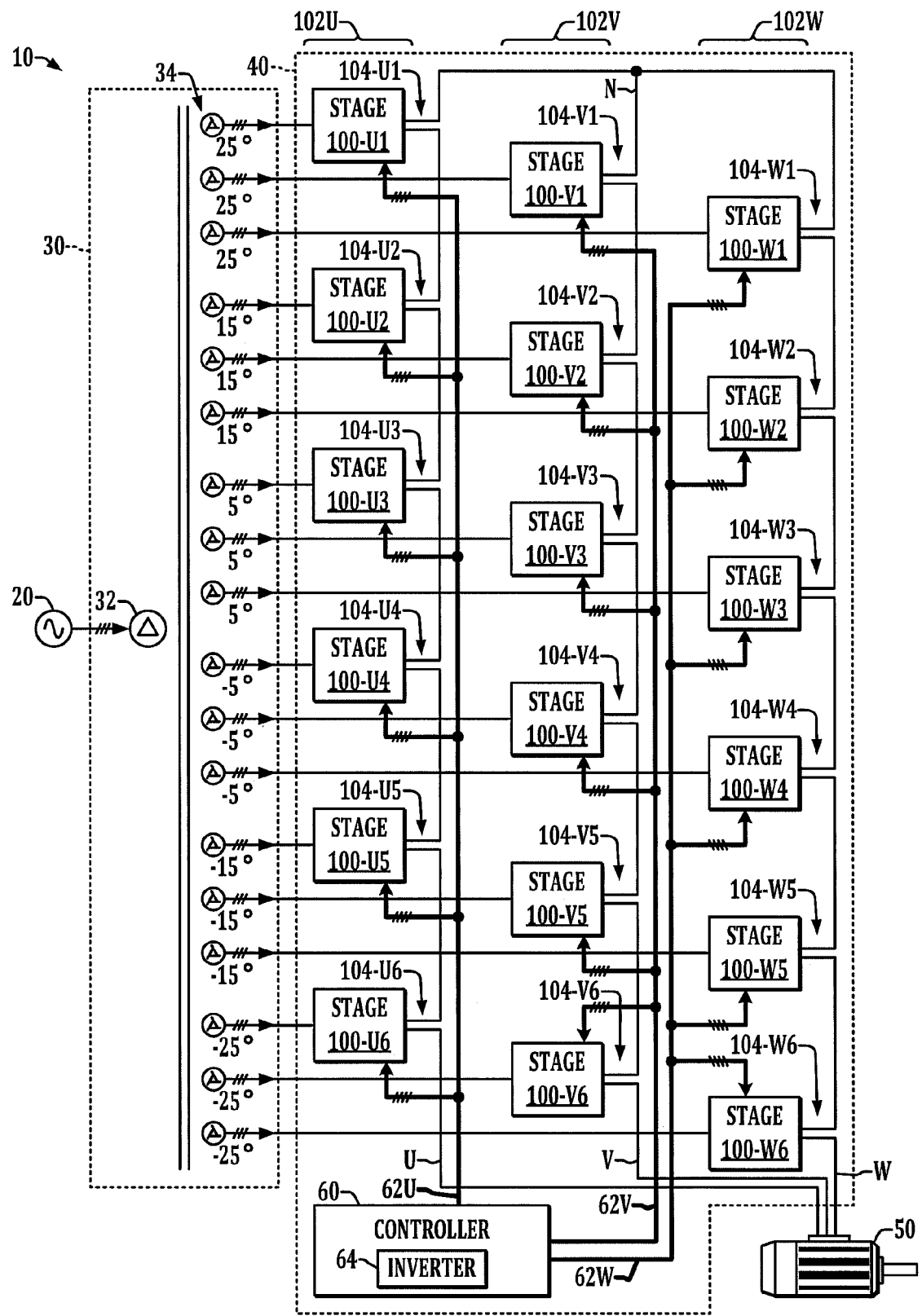
FIG. 1 is a schematic diagram illustrating a three-phase 13-level CHB inverter-based motor drive power conversion system with three inverter legs, each having six power stages or power cells connected in series between a neutral point and a motor load phase.

Referring now to the figures, several embodiments or implementations are hereinafter described in conjunction with the drawings, wherein like reference numerals are used to refer to like elements throughout, and wherein the various features are not necessarily drawn to scale. Multilevel inverter power stage architectures are presented in which precharging and dynamic braking functions are achieved using a single shared resistor with switching circuitry in an intermediate DC bus circuit to selectively connect the resistor to control charging of a DC bus capacitance or to connect the resistor in parallel with the DC bus capacitance to facilitate dissipation of back EMF from a driven motor or other load, while further facilitating normal operation with the resistor bypassed. Dynamic braking and precharging functionality is a desirable combination of features for cascaded H bridge and other multilevel power converter architectures, and the present disclosure provides simple and effective designs for implementing both functions with localized circuitry within the individual power stages forming the cascaded or series-connected multi-cell structures. Dynamic braking apparatus may be used to selectively slow down a motor load being driven by a power converter, and the present disclosure provides selective switching to connect an impedance to dissipate power returning from the motor load as the motor decelerates.

Precharging is also performed using the same impedance to charge up the DC bus capacitor, for example on startup or after disruption of power, where the DC bus voltage drops below a nominal level. Circuitry within the individual power stages is activated when the DC bus voltage is below a predetermined threshold value to charge up the capacitor at a controlled rate by conducting current from the power stage rectifier or other local DC source through the impedance to limit the inrush current to the capacitor thereby protecting the capacitor and charging semiconductor devices against overcurrent conditions. In the illustrated embodiments, for instance, the shared resistor is sized so as to reduce the current spike upon charge up to a manageable level, and also to facilitate dynamic braking operation. The circuitry thus presents a significant advance over conventional multilevel inverters by providing both these functions with a minimal number of circuit elements. The techniques of the present disclosure, moreover, find utility in association with low-voltage as well as medium or high voltage power converter applications involving any number of cascaded power stages using on-board circuitry with a shared resistor sized for the power levels associated with the individual power cell or stage.

An exemplary multilevel inverter motor drive power conversion system 10 is shown in FIG. 1, in which the individual power cells or power stages 100 incorporate precharging and dynamic braking circuitry employing a shared resistor. The power converter 10 includes a three-phase multilevel inverter 40 with series-connected power stages 100-1, 100-2, 100-3, 100-4, 100-5, 100-6 for each of three sections or inverter legs 102U, 102V and 102W associated with the corresponding motor phases U, V and W of a motor load 50. Although the concepts of the present disclosure are shown in the context of a multiphase multilevel inverter driving a motor load, other embodiments are possible in which other forms of load 50 are driven, including without limitation single phase AC loads, wherein the present disclosure is not limited to multiphase motor drive type power converters. In certain embodiments, moreover, the individual power stages 100 include an H-bridge switching circuit or inverter 40 with switching devices (e.g., Q1-Q4 with associated diodes D11-D14 in FIG. 2 below), although any suitable form of output switching circuit 40 may be provided in the individual power stages 100 with two or more switches forming a switching circuit for generating a power stage output having one of two or more possible levels according to switching control signals 62 provided by an inverter control component or controller 64 of a power converter controller 60.

The example of FIG. 1 is a multiphase 13-level inverter 40 with six power cells or power stages 100 for each of three motor load phases U, V and W (e.g., 100-U1, 100-U2, 100-U3, 100-U4, 100-U5 and 100-U6 forming a first inverter leg 102U for phase U; 100-V1, 100-V2, 100-V3, 100-V4, 100-V5 and 100-V6 forming a second inverter leg 102V for phase V; and stages 100-W1, 100-W2, 100-W3, 100-W4, 100-W5 and 100-W6 forming a third inverter leg 102W for phase W). Each of the inverter legs 102 in this example, moreover, is connected between a power converter neutral point N and the corresponding motor lead U, V or W. The various aspects of the present disclosure may be implemented in association with single phase or multiphase multilevel inverter type power conversion systems having any integer number "N" power stages 100, where N is greater than one. In addition, although the illustrated embodiments utilize H-Bridge stages 100 cascaded to form multilevel inverter legs 102 for each output phase of the motor drive system 10, other types and forms of power stages 100 can be used, such as a stage 100 with a switching circuit having more or less than four switching devices, wherein the broader aspects of the present disclosure are not limited to H-Bridge power cells 100 shown in the illustrated embodiments. For instance, embodiments are possible, in which the individual cells 100 may include as few as two switching devices or any integer number of switches greater than or equal to two.

The power converter 10 is supplied with multiphase AC input power from a phase shift transformer 30 having a multiphase primary 32 (a delta configuration in the illustrated embodiment) receiving three-phase power from an AC power source 20. The transformer 30 includes 18 three-phase secondaries 34, with six sets of three delta-configured three-phase secondaries 34, each set being at a different phase relationship. Although the primary 32 and the secondaries 34 are configured as delta windings in the illustrated example, "Y" connected primary windings and/or secondary windings or other winding configurations can alternatively be used. In addition, while the transformer has three-phase primary and secondary windings 32, 34, other single or multiphase implementations can be used, and the secondaries or sets thereof need not be phase shifted. Each three-phase secondary 34 in the example of FIG. 1 is coupled to provide AC power to drive a three-phase rectifier 120 of a corresponding power stage 100 of the three-phase multilevel inverter 40. The inverter 40 in this example is a 13-level inverter with six cascaded H-Bridge power stages 100-U1 through 100-U6 having outputs 104-U1 through 104-U6 connected in series with one another (cascaded) between the neutral N and a first winding U of the three-phase motor load 50. Similarly, power stages 100-V1 through 100-V6 provide series connected voltage outputs 104-V1 through 104-V6 between the neutral N and the second winding V, and power stages 100-W1 through 100-W6 provide series connected voltage outputs 104-W1 through 104-W6 between the neutral N and the third winding W of the motor 50.

In operation, the motor drive controller 60 provides control signals 62U to the power stages 100-U1 through 100-U6 associated with the first motor winding U, and also provides control signals 62V to the power stages 100-V1 through 100-V6 and control signals 62W to the power stages 100-W1 through 100-W6. Although the inverter 40 shown in FIG. 1 is a multiphase unit supplying output power to phases U, V and W to drive a three-phase motor 50, the concepts of the present disclosure are also applicable to single phase converters, for example, a three-phase-to-single phase converter receiving a three phase input from the source 20, with a single series-connected group of cells 100 providing power to a single phase motor or other single phase output load. Moreover, other multiphase outputs can be provided using corresponding series-connected groups of power stages 100 having more than three phases or inverter legs 102.

The motor drive controller 60 and its component 64 can be implemented using any suitable hardware, processor executed software or firmware, or combinations thereof, wherein an exemplary embodiment of the controller 60 includes one or more processing elements such as microprocessors, microcontrollers, FPGAs, DSPs, programmable logic, etc., along with electronic memory, program memory and signal conditioning driver circuitry, with the processing element(s) programmed or otherwise configured to generate the inverter switching control signals 62 suitable for operating the switching devices of the power stages 100, as well as to perform other motor drive operational tasks to drive the load 50.

Figure 2:
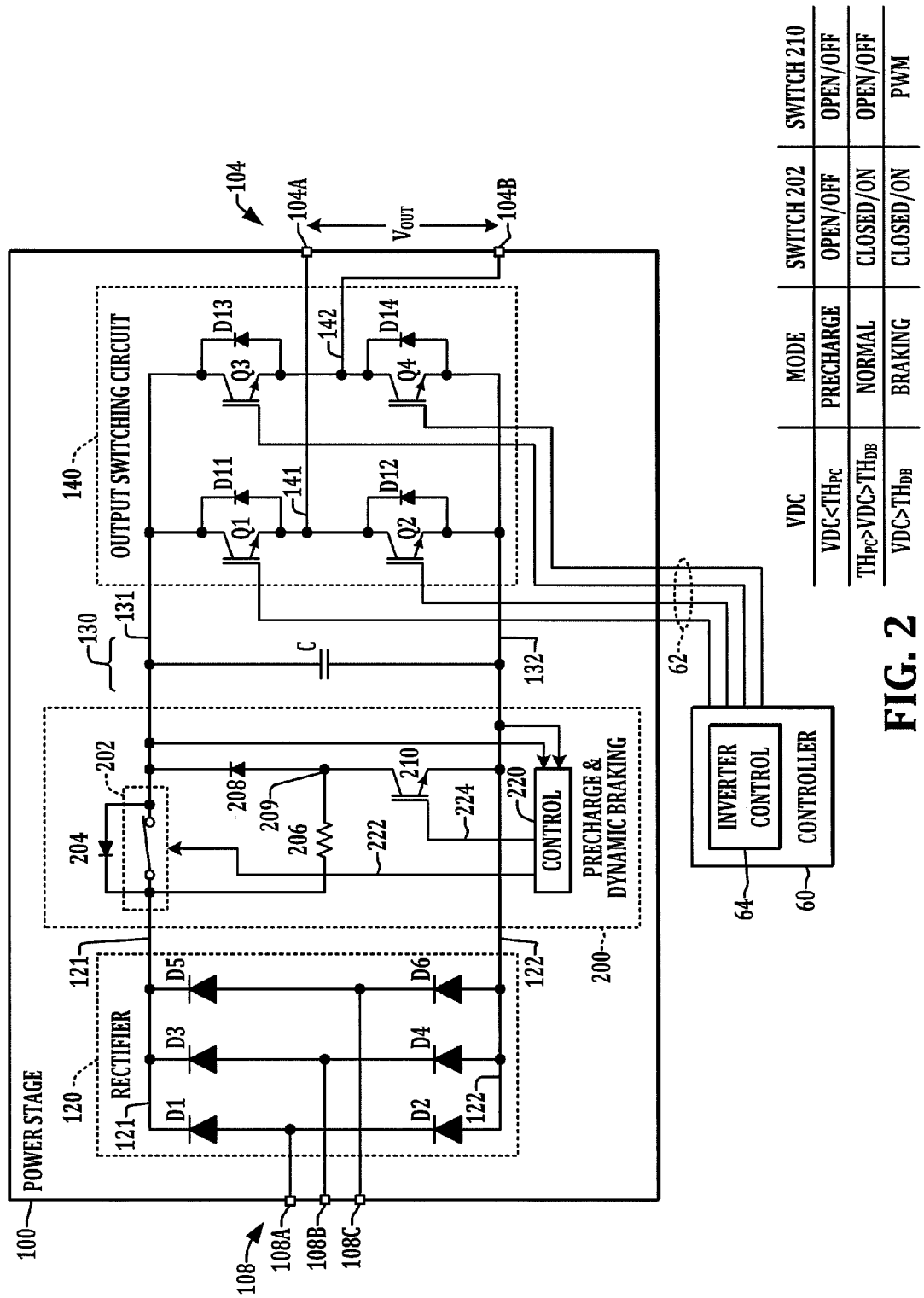
FIG. 2 is a schematic diagram illustrating an exemplary power stage in the power converter of FIG. 1 having a precharge and dynamic braking circuit using a shared resistor in accordance with one or more aspects of the present disclosure.

FIG. 2 illustrates one possible implementation of an H-Bridge power stage 100 which can be replicated to form the cascaded power stages of single or multi-phase multilevel inverters 40 such as that shown in FIG. 1. The power stage in FIG. 2 includes a three phase AC input 108 with input terminals 108A, 108B and 108C connectable to receive AC input power, in this case three-phase power from an AC source such as a secondary winding 34 of the transformer 30 in FIG. 1. Other implementations are possible in which the individual power stages or cells 100 receive single-phase AC input power, or in which the individual power stages 100 receive DC input power from an external DC source (not shown). In the illustrated example, AC input power is provided from the cell input 108 to a rectifier circuit 120 having onboard rectifier diodes D1-D6 forming a three-phase rectifier 120 which receives three-phase AC power from the corresponding transformer secondary 34 and provides DC output power at output terminals 121 (+) and 122 (−) connected to a DC bus circuit 130. In this example, a passive rectifier 120 is used, but active rectifier circuits or other forms of rectifiers can be used, whether having a single or multi-phase AC input.

The power stage 100 in FIG. 2 also includes a DC link or bus circuit 130 and an output switching circuit 140 (e.g., H-Bridge inverter) providing an output voltage $V_{OUT}$ at a controlled one of a plurality of distinct output voltage levels to a power cell output 104 having first and second output terminals 104A and 104B. In certain embodiments, bypass circuitry can be provided in the individual power stages 100 to bypass the output 104 (not shown). The DC bus circuit 130 includes a DC bus capacitor C connected between an upper or first circuit branch extending between the positive output node 121 of the rectifier 120 and a positive input node 131 connected to the output switching circuit 140, and a second or lower circuit branch extending between the negative output node 122 of the rectifier 120 and the negative input node 132 of the output switching circuit 140. As described further below, moreover, a precharge and dynamic braking circuit 200 is provided between the rectifier 120 and the output switching circuit 140.

In normal operation, the rectifier 120 provides DC power across the DC bus capacitor C. The DC link circuit 130, in turn, provides an input to an H-Bridge inverter 140 formed by four switching devices Q1-Q4 configured in an "H" bridge circuit. Although the illustrated power stage 100 operates based on DC power provided by an internal rectifier circuit 120 driven by an AC input from the corresponding transformer secondary 34, any suitable form of a DC input can be provided to the power stages 100 in accordance with the present disclosure, and the power stages 100 may, but need not, include on-board rectification circuitry 120. In addition, any suitable switching circuit configuration can be used in the output switching circuits 140 (e.g., inverter) of individual stages 100 having at least two switching devices Q configured to selectively provide voltage at the stage output 104 of at least two distinct levels. Moreover, any suitable type of switching devices Q may be used in the power stages 100, including without limitation semiconductor-based switches such as insulated gate bipolar transistors (IGBTs), silicon controlled rectifiers (SCRs), gate turn-off thyristors (GTOs), integrated gate commutated thyristors (IGCTs), etc.

The illustrated four-switch H-Bridge output switching circuit 140 advantageously allows selective switching control signal generation by the controller 60 to provide at least two distinct voltage levels at the output 104 in a controlled fashion. For instance, a voltage output $V_{OUT}$ is provided at the output terminals 104A and 104B of a positive DC level substantially equal to the DC bus voltage across the capacitor C (e.g., +VDC) when the switching devices Q1 and Q4 are turned on (conductive) while the other devices Q2 and Q3 are off (nonconductive). Conversely, a negative output voltage level $V_{OUT}$ is provided when Q2 and Q3 are turned on while Q1 and Q4 are off (e.g., −VDC). This configuration also allows a third distinct output voltage level of approximately zero volts by turning on Q1 and Q3 while maintaining Q2 and Q4 off (or alternatively by turning on Q2 and Q4 while maintaining Q1 and Q3 off). Accordingly, the exemplary H-Bridge power stage 100 advantageously allows selection of two or more distinct output voltages, and the cascaded configuration of six such stages (e.g., FIG. 1) allows selective switching control signal generation by the inverter control component 64 to implement 13 different voltage levels (line to neutral) for application to the corresponding motor phase U, V or W. This, in turn, allows for 25 different line to line voltage levels. It is noted that other possible switching circuitry may be used to implement a two, three, or K-level selectable output for individual stages 100, where K is any positive integer greater than 1. Any suitable logic or circuitry in the motor drive controller 60 can be used for providing inverter switching control signals 62 to a given power stage 100, such as carrier-based switching circuitry and/or digital logic implementing pulse width modulated switching control signals 62. In addition, the controller 60 may include signal level amplification and/or driver circuitry (not shown) to provide suitable drive voltage and/or current levels sufficient to selectively actuate the switching devices Q1-Q4, for instance, such as comparators, carrier wave generators or digital logic and signal drivers.

As further shown in FIG. 2, the individual power stages 100 also include a dual function precharge and dynamic braking circuit 200 which may be connected anywhere in the DC path between the rectifier 120 (or other DC input) and the output switching circuit 140. In the illustrated example, the precharge and dynamic braking circuit 200 is configured between the rectifier 120 and the DC bus capacitance C, although other implementations are possible. In accordance with the present disclosure, moreover, the precharge and dynamic braking circuit 200 advantageously employs a single shared resistor 206 operable both for controlled precharging of the DC link capacitor voltage as well as for dynamic braking operation. In addition, first and second switches 202 and 210 are provided in the circuit 200 for selective connection of the resistor 206 for both these purposes. In addition, a precharge and dynamic braking control circuit 220 is provided within each power stage 100 to control the operation of the power stage 100 in one of three distinct modes, as summarized in the table shown in FIG. 2. Specifically, the controller 220 selectively changes the switching states of the precharge and dynamic braking circuit 200 to implement a first mode for precharging the DC link capacitor C, as well as to implement a normal operating mode and a third mode for dynamic braking. In certain embodiments, moreover, the controller 220 selectively sets the operating mode at least partially according to the DC bus voltage in the circuit 130. For example, as seen in FIG. 2, the controller 220 may receive one or more feedback signals indicative of the voltage across the DC bus capacitor C (VDC). Any suitable hardware, processor-executed firmware, processor-executed software, logic circuitry, FPGA, etc. may be used to construct the precharge and dynamic braking controller 220, and any suitable feedback signal or signals may be used by the controller 220 to selectively set the operating mode of the power stage 120 as described herein.

As seen in the table of FIG. 2, at any given time, the exemplary precharge and dynamic braking controller 220 operates the power stage 100 according to the sensed DC bus voltage of the intermediate DC circuit 130, and selectively places the precharge and dynamic braking circuit 200 in one of three distinct operating modes by comparison of the bus voltage with first and second thresholds. Other forms of operational mode switching may be based in various implementations, in whole or in part, on one or more other operating conditions of the motor drive 10 or the power stage 100 thereof. In the illustrated example, circuit 200 includes a resistor 206 coupled between the rectifier 120 and the output switching circuit 140, with the controller 220 operating the circuit 200 in a first operating mode (precharge) to conduct current from the rectifier 120 through the resistor 206 to the capacitor C. In a second (normal) operating mode, the controller 220 operates the circuit 200 to bypass the resistor 206 thereby allowing current to flow directly from the rectifier 120 to the switching circuit 140. Dynamic braking is achieved in a third operating mode to connect the resistor 206 in parallel with the capacitor C.

As seen in FIG. 2, the first switch 202 is coupled in the first DC bus circuit branch between the nodes 121 and 131, and operates according to a first control signal 222 from the controller 220 in a first state (open or non-conductive) to prevent current from flowing directly through the switch 202 between the rectifier 120 and the switching circuit 140. The first switching device 202 is also operable in a second state (closed or conductive) to allow current to flow through the switch 202 according to the control signal 222. Any suitable switching device 202 may be used, such as a contractor, relay, or a semiconductor-based switching device (e.g., IGBT, SCR, GTO, IGCT, etc.), wherein the switching device 202 is preferably sized to accommodate the maximum current flow required in normal operation. Although the embodiment of FIG. 2 provides the first switching device 202 in the upper or positive DC circuit branch 121, 131, other embodiments are possible in which the first switch 202 is alternatively provided in the lower DC circuit branch between the nodes 122 and 132. As shown, moreover, a diode 204 is connected across the switch 202, with the anode terminal connected to the output switching circuit node 131 and the cathode connected to the output node 121 of the rectifier 120. The diode 204 allows regenerative current flow from the output switching circuit 140 to the node 121, for example, during dynamic braking operation, but prevents or blocks forward current flow from the node 121 to the output switching circuit 140 when the switching device 202 is open or non-conductive.

The resistor 206 and a second diode 208 are connected in a circuit branch in parallel with the contacts of the first switching device 202, with the resistor 206 being connected between the node 121 and an internal node 209, with the anode of the second diode 208 being connected to the node 209 and the cathode being connected to the node 131 as shown. In addition, a second switching device 210 is coupled between the second DC circuit branch at nodes 122 and 132 and the first internal node 209. The second switch 210 operates according to a second control signal 224 from the precharge and dynamic braking controller 220, and can be any suitable type of switching device, including without limitation a contactor, relay, or a semiconductor-based switching device (e.g., IGBT, SCR, GTO, IGCT, etc.). The controller 220 includes any suitable logic and signal conditioning and/or driver circuitry to provide the control signals 222 and 224 to properly operate the first and second switching devices 202 and 210 according to the operation and functionality described herein.

Referring also to FIGS. 3-6, FIG. 3 illustrates an exemplary process or method 300 for operating a power conversion system, which may be implemented using the precharge and dynamic braking controller 220 of individual power stages 104 three-mode operation thereof in accordance with various aspects of the present disclosure. Various aspects of the present disclosure further provide non-transitory computer readable mediums, such as an electronic memory operatively associated with the controller 220, which include computer executable instructions for performing the described methods, including the illustrated method 300 of FIG. 3. Although the method 300 is illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated method 300 other methods of the disclosure may be implemented in hardware, processor-executed software, or combinations thereof, such as in the exemplary controller 220 described herein, and may be embodied in the form of computer executable instructions stored in a tangible, non-transitory computer readable medium, such as in a memory operatively associated with the controller 220 in one example.

The illustrated process 300 begins at 302 with application of power to the conversion system 10. As previously mentioned, the precharging features may be employed on initial power up of the system 10 and/or upon resumption of power after a temporary disruption. A determination is made by the controller 220 at 304 as to whether the DC bus voltage is less than a first (precharge) threshold $TH_{PC}$. In one possible implementation, the precharge threshold $TH_{PC}$ can be set at or near the nominal DC bus voltage associated with normal operation of the power stage 100. If the DC bus voltage is at or above the first threshold (NO at 304) the process 300 continues to 308 as described below.

Figure 3:
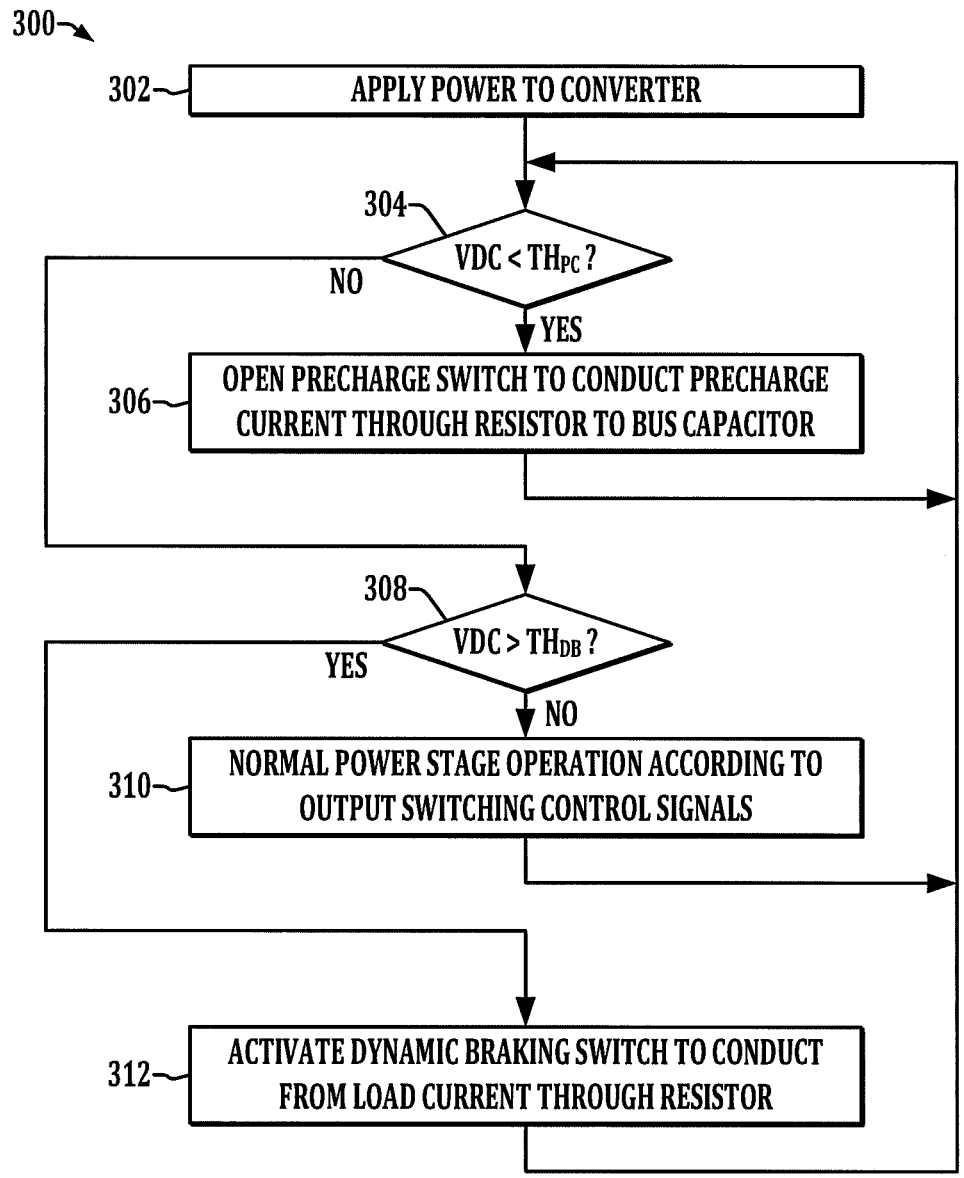
FIG. 3 is a flow diagram illustrating an exemplary method for operating individual power stages in a multilevel inverter in accordance with further aspects of the present disclosure.
Figure 4:
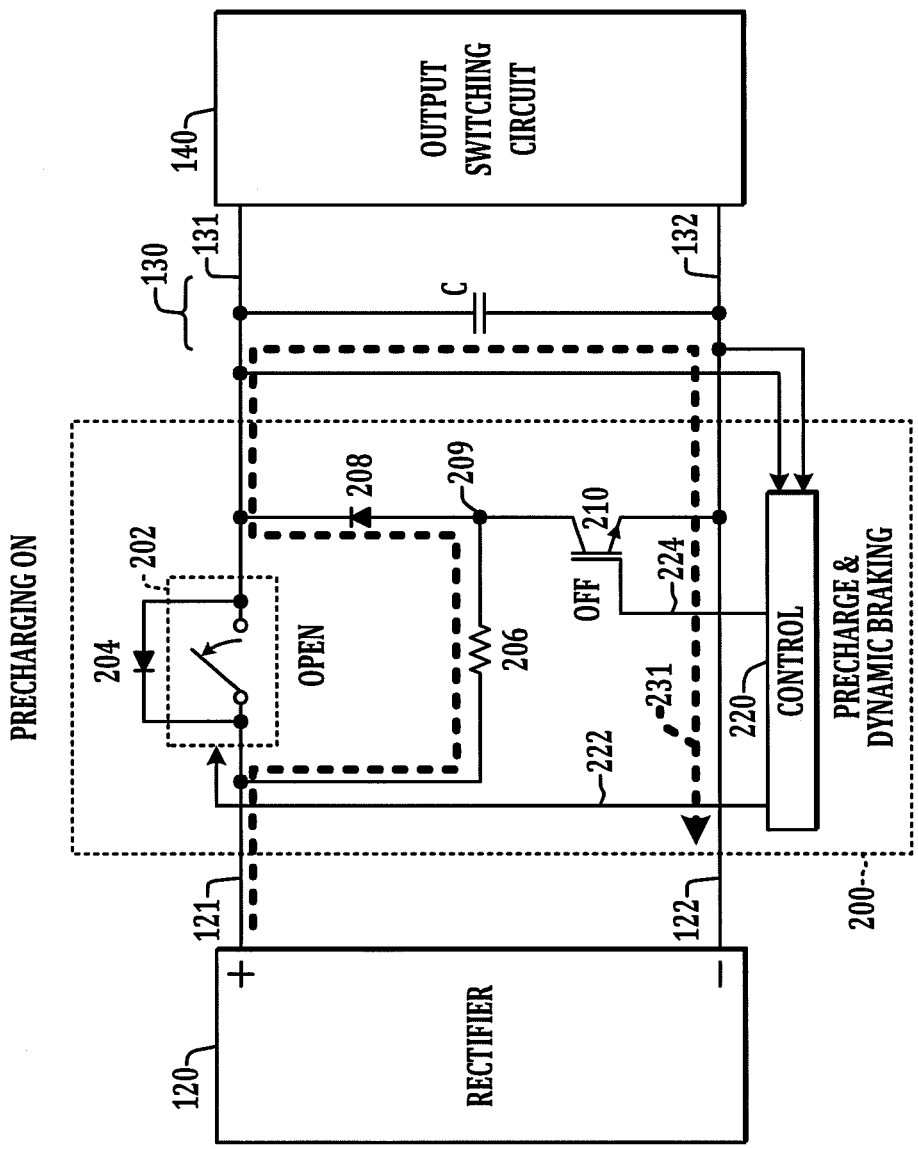
FIG. 4 is a schematic diagram illustrating operation of the power stage of FIG. 2 during a first mode for controlled precharging of a DC bus capacitor through a resistor in a first operating mode.
Figure 5:
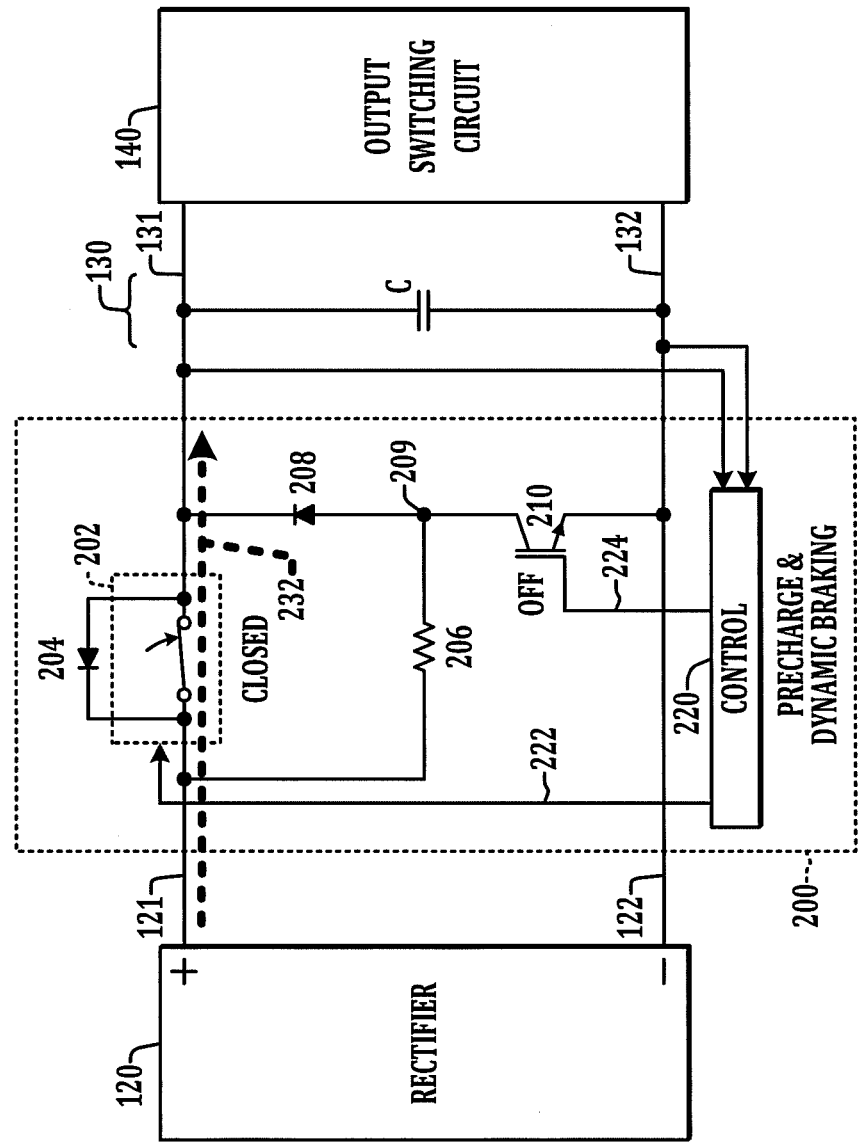
FIG. 5 is a schematic diagram showing operation of the power stage of FIG. 2 during normal operation.

Referring also to FIG. 4, if the bus voltage is less than the threshold $TH_{PC}$ (YES at 304 in FIG. 3), the controller 220 switches to a first operating mode at 306 for precharging the bus capacitor C. As shown in FIG. 4, the controller 220 provides the first control signal 222 in order to open the first (precharge) switch 202 and provides the second control signal 224 to keep the second switch 210 off (non-conductive). As seen in FIG. 4, current from the rectifier 120 in this first precharge mode flows from the node 121 through the resistor 206 and the diode 208 to the node 131, and then through the DC bus capacitor C to the lower DC circuit branch at node 132 to return to the negative rectifier terminal at node 122. For this operation, the resistor 206 has a resistance value selected or designed according to the capacitance of the DC bus capacitor C to control the charging time of the capacitor C. In this regard, the resistance of resistor 206 sets the limit to the inrush current, particularly for a fully discharged bus capacitor C, thereby protecting the semiconductor devices (e.g., a passive rectifier diodes and/or active rectifier switches) of the rectifier 120 from over current conditions, and also protects the capacitor C from high inrush currents. As seen in FIG. 3, moreover, the process 300 returns to again assess the DC bus voltage level relative to the threshold $TH_{PC}$ and continues the precharging operation at 304, 306 until the DC bus voltage is at the threshold level $TH_{PC}$.

When the DC bus voltage is at or above the first threshold level $TH_{PC}$ (NO at 304), the process 300 in FIG. 3 proceeds to 308 where a determination is made (e.g., by the controller 220) as to whether the DC bus voltage exceeds a second (dynamic braking) threshold $TH_{DB}$, which is higher than the first threshold $TH_{PC}$. The second threshold $TH_{DB}$ can be set to any desired level suitable for triggering dynamic braking in the power cell or stage 100, such as about 5%-10% above the nominal DC bus voltage level in one non-limiting example. If the DC bus voltage is between the first and second thresholds (NO at 308), the controller 220 operates in a second or normal mode at 310, with the control signals 222 and 224 maintaining the first switch 202 in the closed or on (e.g., conductive) state and the second switch 210 in an open/off (e.g., non-conductive) state. This operation is further illustrated in FIG. 5, where the DC current flows from the positive rectifier node 121 through the closed first switch 202 to the upper input node 131 of the output switching circuit 140, thereby maintaining the DC bus voltage across the capacitor C and allowing switching operation of the switching circuit 140 according to the switching control signals 62 from the power converter controller 60 (FIG. 1 above).

Figure 6:
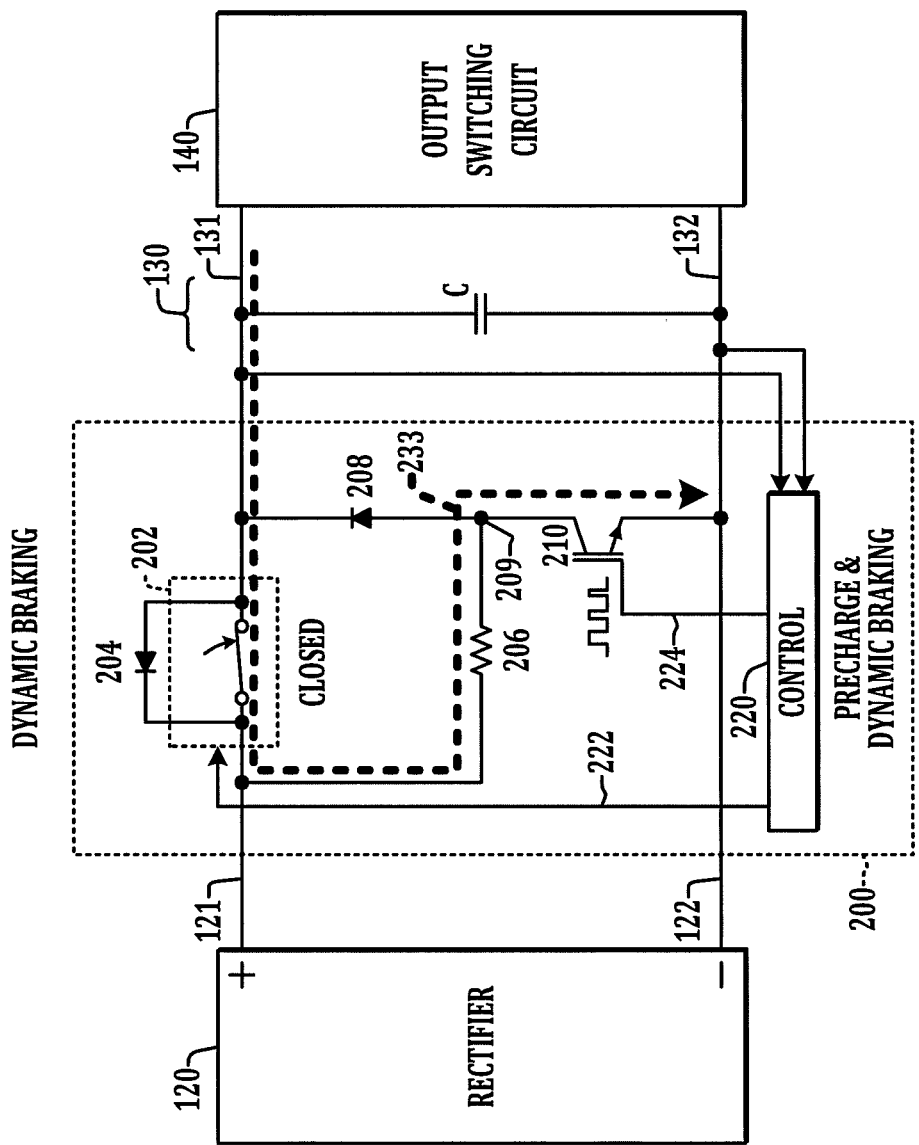
FIG. 6 is a schematic diagram illustrating dynamic braking operation of the power stage of FIG. 2 with the resistor connected in parallel across the DC bus capacitor.

Returning again to FIG. 3, this normal mode operation continues at 304, 308 and 310 while the DC bus voltage is between the first and second thresholds. If, however, the DC bus voltage exceeds the second (upper) threshold $TH_{DB}$ (YES at 308), the process 300 proceeds to 312 with the controller 220 entering a third (dynamic braking) mode. This dynamic braking operation is further illustrated in FIG. 6, with the controller 220 maintaining the first switch 202 in the closed or conductive state via control signal 222, and selectively closing (rendering conductive) the second switch 210 via control signal 224. In certain embodiments, the controller 220 may simply close the switch 210 during the third (dynamic braking) operating mode. In other possible embodiments, moreover, the controller 220 may provide the control signal 224 so as to pulse width modulate the switch 210. In some implementations, for instance, the pulse width modulation operation of the control signal 224 may be controlled at least in part according to the DC bus voltage level, for example, with the controller 220 increasing the pulse width for larger excursions of the DC bus voltage above the threshold $TH_{DB}$. For such pulse width modulated implementations, moreover, any suitable switching frequency may be used in controlling the operation of the second switch 210 via the control signal 224. As seen in FIG. 6, moreover, the operation of the controller 220 in the dynamic braking mode provides a circuit path through the resistor 206 for conducting current from the output switching circuit node 131 back through the closed switch 202 (and/or through the blocking diode 204), and then through the resistor 206 and the switch 210.

Thus, the operation of the controller 220 in the dynamic braking mode provides an impedance via the resistor 206 to dissipate excess energy flowing back from the output switching circuit 140. In this regard, the resistance value of the shared resistor 206 may be set according to a desired braking impedance value, in addition to the above-mentioned inrush current limiting function performed by the resistor 206 in the precharge operating mode. The resistance 206 determines the braking torque, and thus the deceleration rate of a driven motor load 50, and the duty cycle of the pulse width modulated switch 210 determines the power rating of the braking resistor. In certain non-limiting embodiments, for example, the resistor 206 may be set to approximately 5Ω-10Ω.

As seen in FIG. 3, moreover, the process 300 returns to again assess the DC bus voltage at 304 and 308 as described above, thereby implementing three-mode operation of the power cell 100 for selectively precharging the bus capacitor C, operating in normal mode and/or providing dynamic braking.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
  a multilevel inverter, including at least one inverter leg comprising a plurality of power stages, the individual power stages comprising:
    a DC bus circuit with a first DC circuit branch and a second DC circuit branch,
    a rectifier circuit providing a DC voltage to the DC bus circuit,
    an output,
    a switching circuit including first and second switching circuit input nodes, the switching circuit operable according to switching control signals to provide an output voltage at the output at one of a plurality of distinct output voltage levels, and
    a precharge and dynamic braking circuit with a resistor connected between the rectifier circuit and the switching circuit, the precharge and dynamic braking circuit operative in a first operating mode to conduct current from the rectifier circuit through the resistor to charge a capacitor of the DC bus circuit, in a second operating mode to bypass the resistor and allow current to flow from the rectifier circuit to the switching circuit, and in a third operating mode to connect the resistor across the first and second switching circuit input nodes in parallel with the capacitor of the DC bus circuit, the outputs of the at least one inverter leg being coupled in series with one another with an output of a last power stage of the at least one inverter leg providing an output to drive a load; and a controller operative to provide the switching control signals to set the individual output voltage levels of the power stages of the multilevel inverter.

2. The power conversion system of claim 1, wherein the precharge and dynamic braking circuit of the individual power stages comprises:

a first switching device coupled in the first circuit branch of the DC bus circuit between the rectifier and the switching circuit, the first switching device operative according to a first control signal in a first state to prevent current from flowing directly through the first switching device between the rectifier and the switching circuit, and in a second state to allow current to flow through the first switching device;

a first diode coupled in parallel with the first switching device, with a cathode connected to the rectifier and an anode connected to the switching circuit;

a second diode coupled in series with the resistor in a circuit branch parallel with the first switching device, the second diode having an anode connected to the resistor and a cathode connected to the switching circuit; and a power stage controller providing the first control signal to selectively place the first switching device in the first state in the first operating mode, and to place the first switching device in the second state in the second and third operating modes.

3. The power conversion system of claim 2, wherein the precharge and dynamic braking circuit of the individual power stages comprises:

a second switching device coupled between the second DC circuit branch and a first internal node joining the second diode and the resistor, the second switching device operative according to a second control signal in a first state to prevent current from flowing between the first internal node and the second DC circuit branch, and in a second state to allow current to flow between the first internal node and the second DC circuit branch;

wherein the power stage controller provides the second control signal to selectively place the second switching device in the first state in the first and second operating modes, and to place the second switching device in the second state for at least a portion of a time during which the precharge and dynamic braking circuit is in the third operating mode.

4. The power conversion system of claim 3, wherein the power stage controller provides the second control signal to pulse width modulate the second switching device in the third operating mode.

5. The power conversion system of claim 4, wherein the power stage controller changes the operating mode of the precharge and dynamic braking circuit at least partially according to a DC bus voltage of the DC bus circuit.

6. The power conversion system of claim 5, wherein the power stage controller operates the precharge and dynamic braking circuit in the first operating mode if the DC bus voltage is less than a first threshold value, in the third operating mode if the DC bus voltage is greater than a second threshold value, and in the second operating mode if the DC bus voltage is between the first and second threshold values, the second threshold value being greater than the first threshold value.

7. The power conversion system of claim 3, wherein the second switching device is an insulated gate bipolar transistor.

8. The power conversion system of claim 2, wherein the power stage controller changes the operating mode of the precharge and dynamic braking circuit at least partially according to a DC bus voltage of the DC bus circuit.

9. The power conversion system of claim 8, wherein the power stage controller operates the precharge and dynamic braking circuit in the first operating mode if the DC bus voltage is less than a first threshold value, in the third operating mode if the DC bus voltage is greater than a second threshold value, and in the second operating mode if the DC bus voltage is between the first and second threshold values, the second threshold value being greater than the first threshold value.

10. The power conversion system of claim 1, wherein the operating mode of the individual precharge and dynamic braking circuits is determined at least partially according to a DC bus voltage of the DC bus circuit.

11. The power conversion system of claim 10, wherein the individual precharge and dynamic braking circuits operate in the first operating mode if the DC bus voltage is less than a first threshold value, in the third operating mode if the DC bus voltage is greater than a second threshold value, and in the second operating mode if the DC bus voltage is between the first and second threshold values, the second threshold value being greater than the first threshold value.

12. The power conversion system of claim 1, wherein the individual precharge and dynamic braking circuits operate in the first operating mode if a DC bus voltage of the corresponding DC bus circuit is less than a first threshold value, in the third operating mode if the DC bus voltage is greater than a second threshold value, and in the second operating mode if the DC bus voltage is between the first and second threshold values, the second threshold value being greater than the first threshold value.

13. A method for operating individual power stages in a multilevel inverter, the method comprising:

if a DC bus voltage of a given power stage is less than a first threshold value, precharging a DC bus capacitance of the given power stage through a resistor; and if the DC bus voltage of the given power stage is greater than a second threshold value, connecting the resistor in parallel with the DC bus capacitance for dynamic braking of a load driven by the multilevel inverter, the second threshold value being greater than the first threshold value.

14. The method of claim 13, comprising bypassing the resistor to allow current to flow from a rectifier circuit to a switching circuit of the given power stage if the DC bus voltage is between the first and second threshold values.

15. The method of claim 14, comprising pulse width modulating a switch connecting the resistor in parallel with the capacitor for dynamic braking of the load if the DC bus voltage of the given power stage is greater than the second threshold value.

16. The method of claim 13, comprising pulse width modulating a switch connecting the resistor in parallel with the capacitor for dynamic braking of the load if the DC bus voltage of the given power stage is greater than the second threshold value.

17. A non-transitory computer readable medium with computer executable instructions for operating individual power stages in a multilevel inverter, comprising computer executable instructions for:
- precharging a DC bus capacitance of the given power stage through a resistor if a DC bus voltage of a given power stage is less than a first threshold value; and
- connecting the resistor in parallel with the DC bus capacitance for dynamic braking of a load driven by the multilevel inverter, the second threshold value being greater than the first threshold value if the DC bus voltage of the given power stage is greater than a second threshold value.

18. The non-transitory computer readable medium of claim 17, comprising computer executable instructions for bypassing the resistor to allow current to flow from a rectifier circuit to a switching circuit of the given power stage if the DC bus voltage is between the first and second threshold values.

19. The non-transitory computer readable medium of claim 18, comprising computer executable instructions for pulse width modulating a switch connecting the resistor in parallel with the capacitor for dynamic braking of the load if the DC bus voltage of the given power stage is greater than the second threshold value.

20. The non-transitory computer readable medium of claim 17, comprising computer executable instructions for pulse width modulating a switch connecting the resistor in parallel with the capacitor for dynamic braking of the load if the DC bus voltage of the given power stage is greater than the second threshold value.

* * * * *